United States Patent [19]

McCowin

[11] Patent Number: 5,700,347
[45] Date of Patent: Dec. 23, 1997

[54] THERMOPLASTIC MULTI-TAPE APPLICATION HEAD

[75] Inventor: Peter D. McCowin, Enumclaw, Wash.

[73] Assignee: The Boeing Company, Seattle, Wash.

[21] Appl. No.: 585,362

[22] Filed: Jan. 11, 1996

[51] Int. Cl.$^6$ .................................................. B65H 81/00
[52] U.S. Cl. .......................... 156/425; 156/441; 156/498; 156/499; 156/523; 156/574
[58] Field of Search .................................. 156/169, 173, 156/175, 425, 433, 441, 573, 523, 498, 499, 320, 322, 309.6, 308.2, 309.9

[56] References Cited

U.S. PATENT DOCUMENTS

| | | |
|---|---|---|
| 3,959,091 | 5/1976 | Moji et al. . |
| 3,989,876 | 11/1976 | Moji et al. . |
| 4,010,884 | 3/1977 | Rothman . |
| 4,473,446 | 9/1984 | Locke et al. . |
| 4,489,123 | 12/1984 | Schijve et al. . |
| 4,500,589 | 2/1985 | Schijve et al. . |
| 4,714,509 | 12/1987 | Gruber . |
| 4,715,923 | 12/1987 | Knoll . |
| 4,790,898 | 12/1988 | Woods . |
| 4,859,267 | 8/1989 | Knoll . |
| 4,867,834 | 9/1989 | Alenskis et al. ........... 156/425 X |
| 4,894,105 | 1/1990 | Dyksterhouse et al. . |
| 4,909,880 | 3/1990 | Kittelson et al. ........... 156/425 X |
| 4,919,739 | 4/1990 | Dyksterhouse et al. . |
| 4,935,291 | 6/1990 | Gunnink et al. . |
| 4,943,472 | 7/1990 | Dyksterhouse et al. . |
| 4,990,213 | 2/1991 | Brown et al. ............. 156/498 X |
| 4,992,323 | 2/1991 | Vogelesang et al. . |
| 4,997,503 | 3/1991 | Bohannan et al. .......... 156/173 X |
| 5,015,326 | 5/1991 | Frank ...................... 156/573 X |
| 5,030,488 | 7/1991 | Sobolev . |
| 5,039,571 | 8/1991 | Vogelesang et al. . |
| 5,110,395 | 5/1992 | Vaniglia .................. 156/425 X |
| 5,128,198 | 7/1992 | Dyksterhouse et al. . |
| 5,143,276 | 9/1992 | Mansbridge et al. . |
| 5,160,561 | 11/1992 | Gruber . |
| 5,160,568 | 11/1992 | Gruber . |
| 5,160,771 | 11/1992 | Lambing et al. . |
| 5,181,647 | 1/1993 | Runyan . |
| 5,256,230 | 10/1993 | Winkel ................... 156/425 X |
| 5,266,139 | 11/1993 | Yokota et al. ............ 156/425 X |
| 5,447,586 | 9/1995 | Tam ....................... 156/425 X |

FOREIGN PATENT DOCUMENTS

| | | |
|---|---|---|
| 307 215 B1 | 3/1989 | European Pat. Off. . |
| 0431916 | 6/1991 | European Pat. Off. . |
| 0463611 | 1/1992 | European Pat. Off. ........ 156/173 |
| 0534092 | 3/1993 | European Pat. Off. . |

OTHER PUBLICATIONS

FIBERITE® Data Sheet 5: "Fabricating with Aromatic Polymer Composite, APC-2," 1986.
B. Blichfeldt and J.E. McCarty, "Analytical and Experimental Investigation of Aircraft Metal Structures Reinforced with Filamentary Composites, Phase II—Structural Fatigue, Thermal Cycling, Creep, and Residual Strength," NASA Contractor Report: Jun., 1984.

*Primary Examiner*—Jeff H. Aftergut
*Attorney, Agent, or Firm*—Christensen, O'Connor, Johnson & Kindness PLLC

[57] ABSTRACT

A thermoplastic head for laying down a plurality of thermoplastic resin-impregnated tapes to form a composite. The head includes a clutch, of substantially equal static and dynamic friction coefficients, coupled to the tape spools to maintain the tapes under controlled tension; a tape guide assembly of unique design to align the tapes and prevent gaps between adjacent tapes; a guillotine-type shear cutter to cut off the tapes and a set of rethread rollers to hold the cut tapes to obviate the need for rethreading at the end of each tape lay down cycle; a heating assembly to provide high temperature heat on demand; and that provides cooler gas to avoid heat damage when the head is not laying down tape; unique compression rollers that are able to withstand high temperature operating conditions; and an actively cooled post-compression foot, with cooling fins, for cooling and consolidating laid down tape. The head has a tiltable roller assembly to accommodate edge misalignment and edge-stepdown.

18 Claims, 8 Drawing Sheets

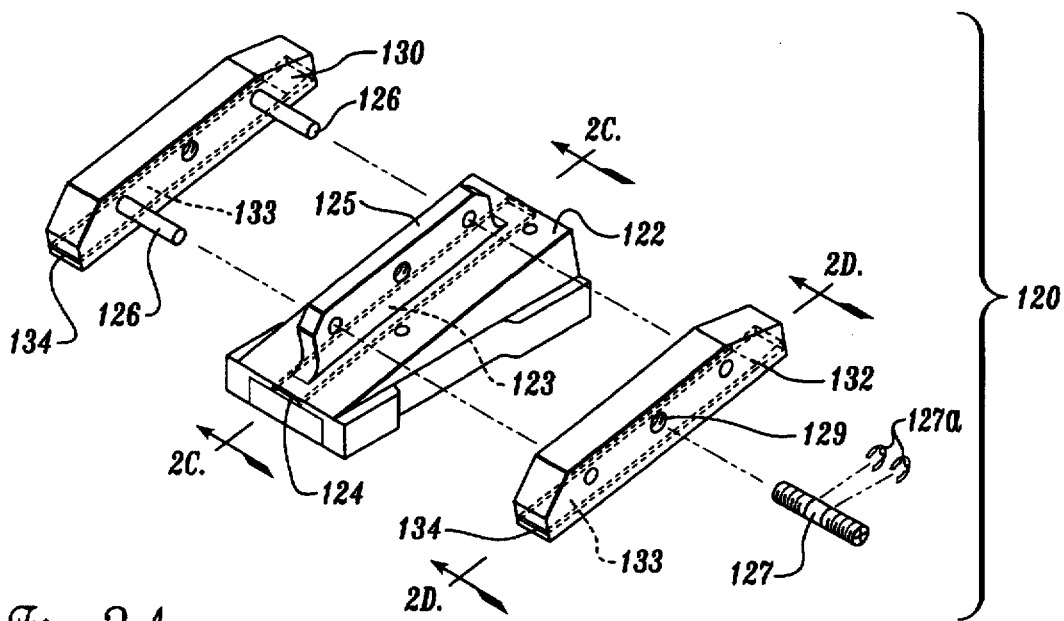
Fig. 2A.
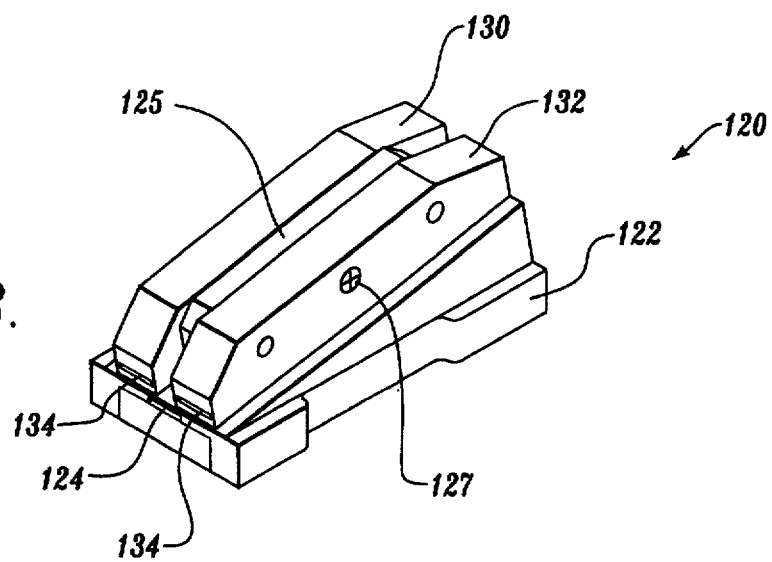
Fig. 2B.
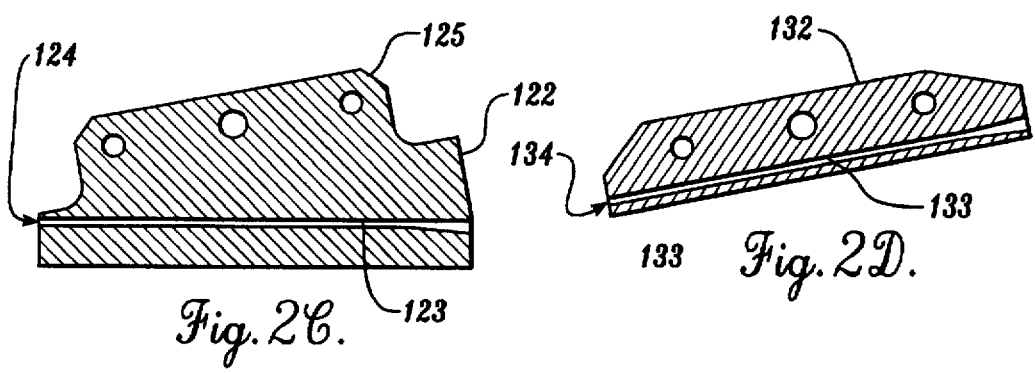
Fig. 2C.
Fig. 2D.

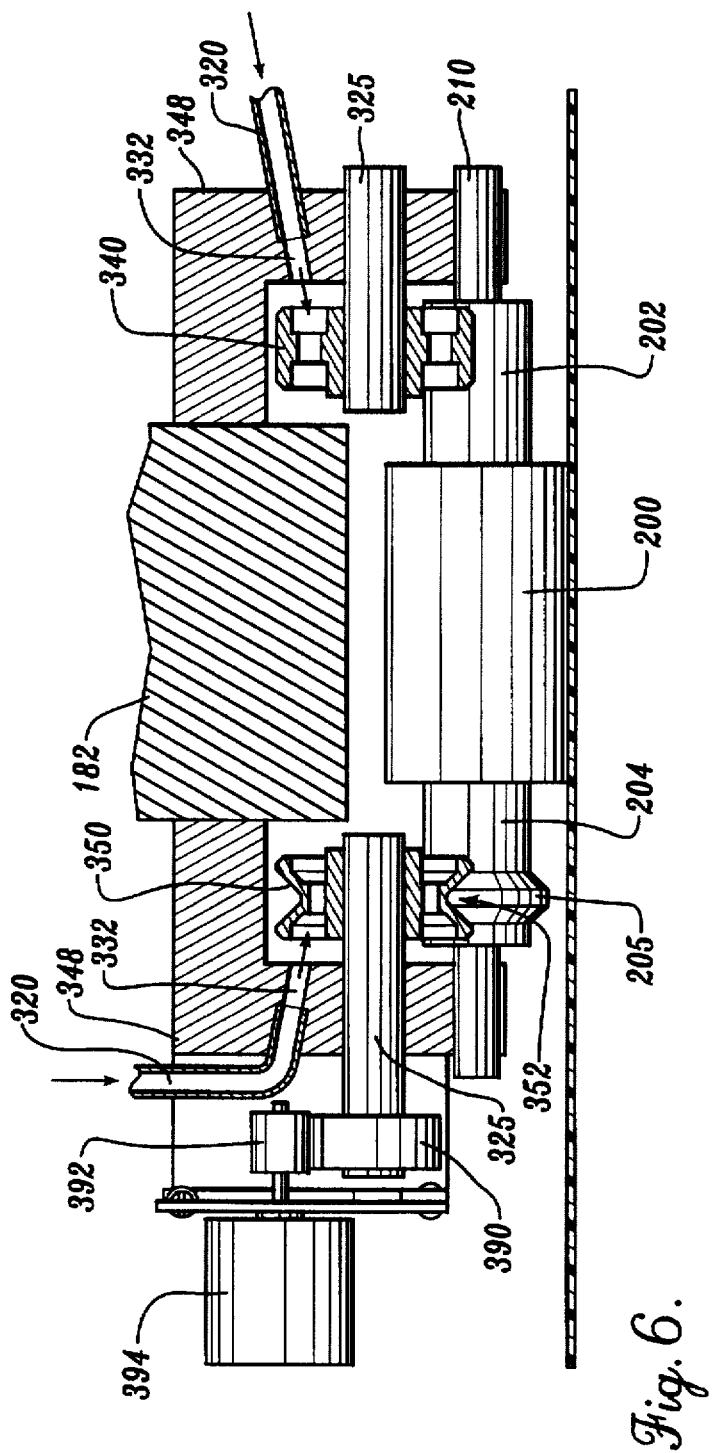

THERMOPLASTIC MULTI-TAPE APPLICATION HEAD

FIELD OF THE INVENTION

This invention relates to the manufacture of thermoplastic composite laminates from tapes that include a reinforcing filler material, such as carbon fiber filaments, and a thermoplastic bonding resin. More particularly, the invention provides a thermoplastic head for simultaneously laying down a plurality of tapes, side-by-side, thereby significantly improving the rate of composite production.

BACKGROUND OF THE INVENTION

Composite materials are strong, lightweight, resistant to corrosion, and may be coated in a variety of colors. Consequently, composites have many attractive features for use in a variety of applications including, but not limited to, motorcycle fairings, automobile parts, aircraft skin, orthopaedic implants, and protective housing for equipment. The extent of application of composites is frequently, however, limited by considerations such as cost and strength required for a particular application. In general, structural thermoplastic composites are either prepared by successively laying down and consolidating layers of fibers or tapes of fibers impregnated with a thermoplastic resin, or by stacking layers in a mold, then consolidating these into a laminate. During this consolidation step, particularly when tapes are used, void spaces tend to arise in the composite. These spaces are caused by incomplete adhesion of tape layers to each other when laid down, crimping of the tape, or gaps between strips of tape. These voids are undesirable because they result in reduced composite strength and increased risk of failure.

European patent publication 0 431 916 B1 discusses some problems encountered in laying down tape to form a contoured shape. The publication recognizes that thermoplastic tape has a natural bias so that when unrolled it will not lie in a straight line, but has a slight curvature. The publication suggests the use of a magnetic clutch to control the applied tension to a mandrel from which the resin tape is spooled off. Further, the publication suggests a pressure foot, in the form of a shoe or a rotatable roller, for pressing heated tape onto a work surface to keep it from moving. It is also suggested that the tape should be heated just prior to lay down to reduce resin viscosity, and thereby the load required to draw the tape. There is, however, no teaching or suggestion in the EPO application about how to simultaneously lay down tape side-by-side from a multiplicity of tape spools. While laying down one tape presents a problem of tape curvature due to natural bias, this problem is compounded when, for instance, three tapes are laid down side-by-side through the same thermoplastic head to form a unitary composite. The patent publication does not address this issue. The patent publication also does not address the issue of "thermal inertia" - - - the time delay in supplying energy to heat tape to a required temperature at the beginning of each tape lay down cycle. Generally, when tape is laid down in successive strips, then at the end of laying down a strip, the tape is severed, and heat supply is cut off to avoid overheating mechanical parts of the head. The head is then moved into position to commence a new cycle of laying down a next strip of tape. At that point, immediate heat at the required temperature is needed to consolidate the tape. However, as a practical matter, equipment will have cooled down due to the cut-off of heat at the end of the previous cycle. Thus, temperature increases over a period of time before reaching the required temperature. As a result, the first section of tape laid down may not be adequately consolidated, leading to increased risk of composite failure. U.S. Pat. No. 4,714,509, relating to a method and apparatus for laying down tapes, also does not address these issues.

There exists a need for a thermoplastic head that is able to lay down multiple tapes without the formation of void spaces. Moreover, all the tapes should be consolidated evenly under heating and compression to avoid other sources of void development. To facilitate rapid production of a composite, the thermosetting head should allow shearing of the tape at the end of one lay down cycle, movement of the head to the point of commencement of the next cycle, and commencement of the next tape lay down cycle without a need to rethread the tape or reheat head parts, such as the compression roller, that should be at a sufficiently high temperature to consolidate the tapes at cycle commencement. Moreover, the apparatus must be sufficiently adaptable so that it is able to lay down tape on surfaces that are inclined at an angle transverse to the direction of tape lay down.

SUMMARY OF THE INVENTION

The invention provides a thermoplastic head for laying down a plurality of tapes simultaneously to produce a thermoplastic composite. The head incorporates features that allow fine tuning of the spaces between tapes being laid down side-by-side to eliminate gaps between these tapes and thereby avoid the formation of voids. Tape is tensioned by constant-friction clutches (i.e. the static and dynamic coefficients of friction of the clutches are substantially the same) that control the torque of spindles of a mandrel assembly on which tape spools are mounted. The tape is consolidated under a compression roller, with heat supplied by hot gas. The compression roller is of a unique design that allows it to withstand high temperatures. At the end of each lay down cycle, the tape is sheared and its ends are held in a nip so that when the thermoplastic head is moved into position to commence a next cycle, there is no need to rethread the tape. The heating system is rapidly adjustable to provide sufficient heat from hot gas virtually immediately so that the tape can be consolidated at the required temperature at the beginning of a cycle, while also reducing supplied gas temperature (through injection of cold inert gas) at the end of a cycle to avoid overheating of thermoplastic head parts between cycles.

The thermoplastic head of the invention is supplied with tape from a mandrel that is controlled by a tensioning constant friction clutch so that tensioned tape is supplied to a tape guide assembly. The tape guide assembly of the invention includes a series of side-by-side guide channels that are sized to match the width of the tape being laid down. The guide assembly include an adjustment screw for adjusting spacings between the guide channels thereby effectively adjusting spacings between tape being laid down through the assembly. The tape exiting from the guide assembly enters into the nip space between a pair of guide rollers, one of which is driven by a motor through a clutch. The guided tapes are drawn through the nip of the guide rollers and pushed through a slot in a guillotine-type shear cutter to beneath a rotatable compression roller mounted with its longitudinal axis transverse to the direction of tape lay down. Heat for tape consolidation is supplied by hot gas from a gas heater located near the roller. The heat reduces the viscosity of the resin and the compressive force of the roller consolidates the tape onto the workpiece. A cooling and post-compression foot, located behind the compression roller, applies pressure to the laid down tape. The post-compression foot is supplied with cooling fins on its upper surface. To assist in cooling, cold air is blown onto the fins to carry away heat.

In order to maintain the tape at a constant tension during the tape lay down operation and between lay down cycles, a unique clutch of a material that has substantially the same static and dynamic coefficients of friction is coupled to the spindles of the mandrel assembly from which tape is spooled for consolidation. Preferably, the material is of Delrin® plastic (Delrin is the trade name for an acetal polymer supplied by DuPont de NeMours, Inc. of Delaware).

The heater supplying hot gas for consolidating the tapes includes an electrical resistance heater supplied with an inert gas, such as nitrogen. The hot gas exits from the heater and enters a plenum supplied with a gas exit nozzle that directs the hot gas onto the tape near a point of tangential contact of the compression roller with the workpiece. Thus, the hot gas provides the heat that consolidates the composite. At the end of a lay down cycle, the tape is sheared and the compression roller is lifted from the workpiece. To prevent overheating of the roller and possible damage, cold gas is charged to the plenum. Thus, the exit gas temperature from the plenum rapidly decreases. When a next cycle commences, the cold gas charge is shut off and hot gas at the required temperature for resin consolidation is virtually immediately available.

The compression roller of the invention is of a unique design enabling it to withstand the high temperatures necessary for tape consolidation. In one embodiment, the driven compression roller is supplied with air-cooled bearings to maintain its capability to rotate freely. In another embodiment, the compression roller is driven by cooled drive rollers cooperating with ends of an axle extending from the roller. These drive rollers are cooled with cold gas, such as air, that removes heat from the compression roller. The cooled rollers are driven by a motor through a clutch.

As described above, at least three clutch mechanisms cooperate with mechanisms that control the rate of tape movement: the clutch on the tape spindles, the clutch on the driven rethread roller, and the clutch of the compression roller. Under normal tape lay down operation, the head traverses the workpiece at a controlled rate. This rate may require tape at a rate that exceeds the rate of tape feed under the roller and/or through the rethread roller nip. Under these conditions, the clutches of these respective devices disengage so that tape tension is determined by the engaged clutch on the spindles.

To accommodate edge misalignment during tape lay down, the compression roller assembly is tiltably mounted beneath the upper thermoplastic head housing that contains the tape guide assembly and tape rethread rollers. The resilient mounting is achieved by matched opposing tensioned springs extending between, and on either side of, the housing and assembly. The assembly is mounted to a frame that has cammed surface portions that cooperate slidingly with cylindrical surfaces of needle roller bearings attached to the upper housing so that the roller is able to controlledly tilt along its axis (in a direction transverse to the tape lay-down direction), tensioning the spring on the downward moving side of the roller and allowing contraction of the opposing spring at the lifting side of the roller. This spring- and cam-controlled tilting allows the thermoplastic head of the invention to accommodate edge misalignment and edge step-down.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2A is a partially exploded view of an embodiment of a tape guide assembly of the invention;

FIG. 2B is a perspective view of the tape guide assembly of FIG. 2A;

FIG. 2C is a cross-sectional view of the central body portion of the assembly of FIG. 2A;

FIG. 2D is a cross-sectional view of the side body portion of FIG. 2A;

FIG. 6 is a simplified cross-section of an alternative embodiment of the compression roller, showing cooling drive rollers; and FIGS. 6A and 6B are side views of embodiments of cooled rollers for use in the thermoplastic head of the invention.

DETAILED DESCRIPTION OF THE PREFERRED EMBODIMENTS

The invention provides a unique thermoplastic head for applying thermoplastic resin-impregnated tape from a plurality of tape spools onto a workpiece to produce a composite that has significantly reduced void spaces. The thermoplastic head of the invention aligns each of the tapes and guides the tapes so that they are laid down side-by-side, without intervening gaps. Moreover, the head heats and compresses the tapes onto the workpiece, and thereafter cools and consolidates the tapes under pressure to form a composite.

For ease of description, the terms "front" or "forward", relating to components of the thermoplastic head, indicates a direction closer to the tape spools which are regarded as being ahead of the front end of the thermoplastic head. The terms "rear" or "behind" indicate a direction closer to the post-compactor at the rear end of the thermoplastic head. The term "transverse" means at right angles to the direction of tape lay-down or to an axis extending from the front to the rear of the thermoplastic head.

Figure 1:
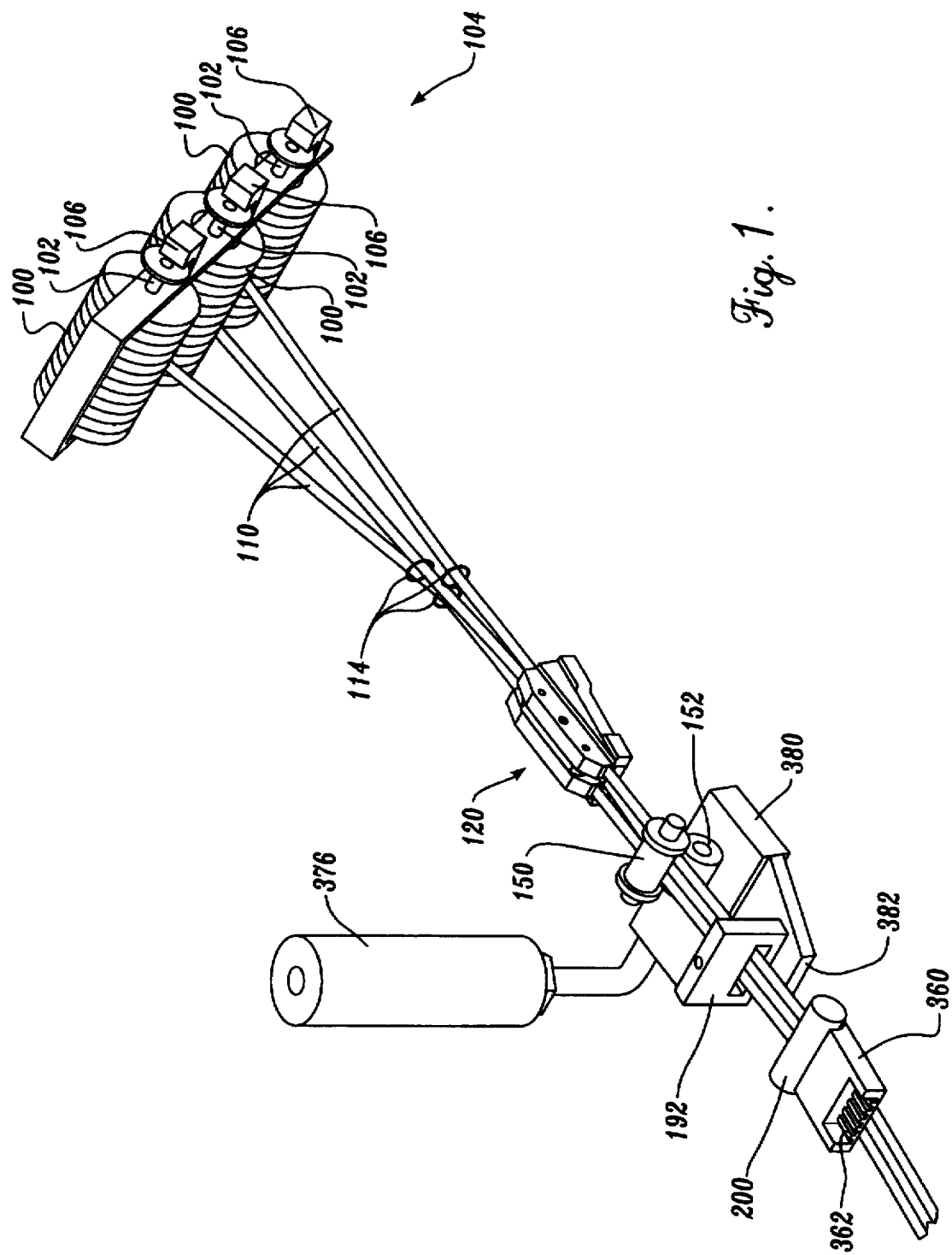
FIG. 1 is a simplified perspective view of an embodiment of the thermoplastic head of the invention.

The advantages of the invention may be more readily understood with reference to the appended figures illustrating preferred embodiments of the invention. FIG. 1, in particular, is simplified for ease of understanding. Spools of tape 100 are each rotatably mounted on tensioning spindles 102 of a mandrel assembly 104. Each of the tensioning spindles is mechanically coupled to a tensioning clutch friction 106 that has substantially the same static and dynamic, so that tape 110 is reeled off the spools 100 under controlled tension. This type of clutch prevents the phenomenon of high tape tension due to high static coefficient of friction at the start of a tape lay down cycle and then sudden reduced tension due to lower dynamic friction. Preferably, coupling clutch plates are made of or coated with a substance that has substantially the same static and dynamic friction, such as Delrin®, an acetal homopolymer.

Before entering into the thermoplastic head, the tapes may optionally be guided through individual guide rings 114. If the distance between the mandrel 104 and the thermoplastic head is sufficiently long, then tape guide rings may not be needed. Nevertheless, if required, these guide rings guide the tapes into a tape guide assembly 120 and prevent the tapes from folding over in a longitudinal direction.

As will be explained in more detail later, the tape alignment assembly includes a plurality of channels, each sized to receive the width of a tape and guide the tape to an exit slot. The spacings between adjacent channels are adjustable so that any gaps between the tapes guided in these channels can be eliminated. The tapes exiting from the tape alignment assembly then pass through the nip between a pair of rethread rollers 150, 152. Upon exiting from this nip, the tape enters a slot in a shear cutter 170 before being laid down under the heated compression roller 200. Thus, when the tape is sheared at the end of a lay down cycle, the remaining tape is held in the nip between the rethread rollers. To commence the next lay down cycle, the tape is pushed through the slot in the shear cutter 170, by motive force of the rethread rollers, and deflected downward and pulled beneath the driven compression roller 200. This avoids the need for manual rethreading at the end of each cycle and considerably increases the productivity of the apparatus of the invention.

The compression roller is urged downward toward the workpiece thereby pressing heated tape onto the workpiece. Heat is supplied by a heating unit that includes at least one electrical resistance heater 376 through which an inert gas is passed for heating. The heated gas enters a mixing plenum 380 located on the forward side of the heated compression roller. Hot gas exits from a wide narrow rectangular slot nozzle 382 with radius ends that approximates the length of the compression roller and impinges on the tapes. The heated gas causes the resin of the tape to soften and the compression roller then presses the reduced-viscosity resinous tape onto the workpiece. A post-compactor 360 presses down on the laid down tape to post-compact the tape together with previously laid down tape to form a composite. The post-compactor is supplied with a plurality of fins 362, which in conjunction with forced air, facilitates dissipation of heat.

Figure 2:
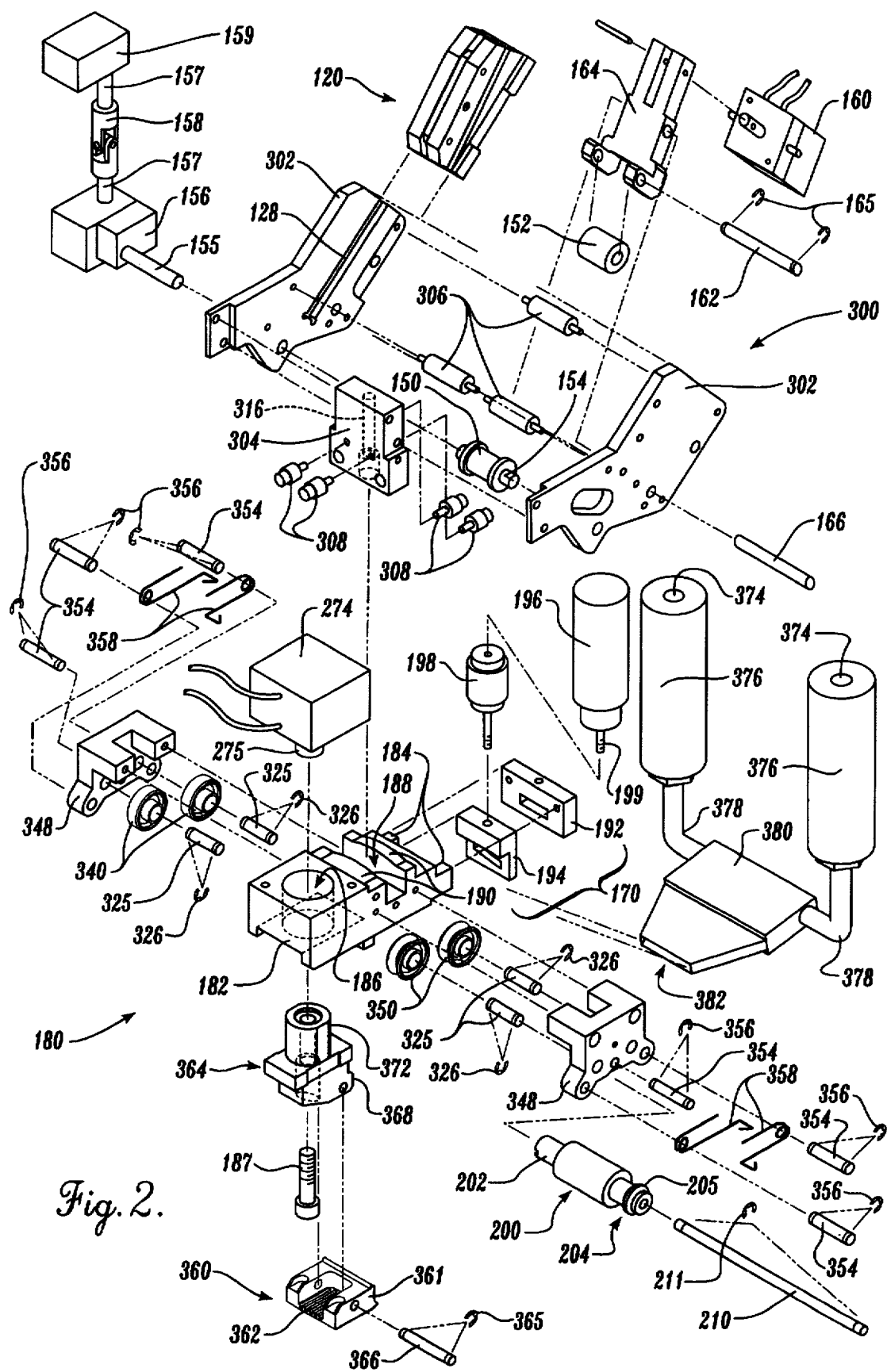
FIG. 2 is an exploded view, showing important components, of an embodiment of a thermoplastic head according to the invention.

Additional details of an embodiment of a thermoplastic head in accordance with the invention is shown in FIG. 2, an exploded view. The head has a pair of longitudinally extending side housing plates 302, 302 and a transverse end housing plate, or support mast, 304 that are mechanically fastened together with the end plate at the rear ends of the side plates to form a housing 300 for the tape alignment assembly 120 and the rethread nip rollers 150, 152. The housing side plates 302 are maintained a predetermined distance apart by horizontally-oriented cylindrical spacers 306. Each of these spacers is of predetermined length, and has smaller diameter protrusions from each end that cooperate with mating bores in the housing side plates to space these plates apart.

The tape alignment guide assembly 120, shown in more detail in FIGS. 2A, 2B, and 2C, has a central generally wedge-shaped body portion 122 with a channel 123 sized to receive and guide a tape extending longitudinally therethrough. The channel terminates in an outlet guide slot 124 through which the tape exits from the central body portion. A flange 125 is mounted longitudinally on top of the central body potion 122, with three longitudinally spaced bores extending therethrough. Side rectangular guide member bodies 130, 132 are adapted for mounting, one on each side of the flange, on top of the central body portion 122. Each of the side guide members has a longitudinal tape guide channel 133 extending therethrough for receiving and guiding a tape to an exit guide slot 134. Each of the channels 123, 133 preferably has a frontal tape entrance opening larger than its respective tape outlet guide slots to assist in rethreading tape, as seen more clearly in FIGS. 2C and 2D. Mounting of the side guide members onto the central body portion 122 is achieved by means of two transverse pins 126 and a positional drive screw 127. The pins 126 extend from a side of side body portion 130, through two of the outermost of the three bores in flange 125 and into cooperating transverse bores in side body portion 132. The positional drive screw 127 has a central unthreaded portion sized to fit within the central transverse throughbore of flange 125. The central portion is held in place in this bore by snap rings 127a that engage spaced circumferential grooves on the screw on each side of the bore. The drive screw has threading on either end of opposite hand. When mounted in the bore of the flanges 125, the threaded ends of the screw extend outward from either side of the flange and engage threaded central threaded transverse bores 129 in each of the side body portions to fasten the side body portions to the central body portion. By adjusting the positional drive screw, the transverse distance between side body portions, and hence the distances between the exit slot of the central body portion 124 and the guide slots of the side members 134, may be adjusted. As a result, any spaces between tapes exiting from these slots would be adjusted accordingly.

Returning to FIG. 2, the tape guide assembly 120 is mounted onto ledges 128, angled downward from the front to rear, that extend from interior surfaces of each of the housing side plates 302.

The tape rethread drive nip roller 150, and idler roller 152, are mounted, with their axes transverse to the direction of tape lay down, directly behind the tape guide assembly 120 so that tape exiting from the guide slots readily enter into the nip between the rollers. The drive roller 150 has an integral axial shaft 154 that is coupled to a drive shaft 155 driven through a worm drive gear box 156 with a one-way clutch. A drive rod 157 extends vertically from the gear box, through a universal joint 158, to a controlled servo-motor 159 that drives the roller 150. Idler roller 152 is mounted on an axial shaft 162 that is rotatably mounted in bores in two parallel spaced-apart flanges that extend rearward of idler roller support mount 164. Grooved ends of the transverse roller shaft 162 protrude outside each of the flanges, and split rings 165 engage the grooves to hold the idler roller rotatably in place between the flanges. The idler roller mount 164 has a bore extending transversely therethrough, so that the mount is able to pivot about a transverse mounting rod 166 extending through the bore. The ends of the mounting rod engage cooperating bores on the inside of the housing, in housing plates 302, so that the idler roller is able to pivot relative to the housing. A pneumatic actuator cylinder 160 is mechanically attached to the pivotable idler roller mount 164 near the upper end of the mount so that when the actuator pulls backward on the mount above its pivot point, the mount pivots about its mounting rod 166 and urges the idler roller 152 upward against the driven roller 150. Thus, the pneumatic actuator controls the pressure exerted in the nip between the rollers and thereby, together with clutches 106, the tension on the tape as it is drawn through the nip.

A second assembly, the compression roller assembly 180, is mounted to the rear end of, and below, the above-described housing 300. This assembly has a central mounting frame 182 to which other components are mounted to form the compression roller assembly 180. The frame 182 is tiltably attached to the housing 300. In order to achieve this attachment, the lower portion of the housing end plate or mast 304 fits into a cooperating transverse slot 188 in the frame 182 sized to receive the mast portion. The slot is supplied with upwardly curved transversely extending walls, or camming surfaces, 190 on either side. The curvature of each wall approximates portions of the circumference of a circle with its center at the midpoint of the line of contact between the surface of the cylindrical compression roller 200 and the workpiece. These camming surfaces 190 each cooperate slidingly against longitudinally extending cylindrical surfaces of pairs of spaced-apart needle roller bearings 308 attached to each of the horizontal faces of end plate 304. The space between the bearings of each pair is such as to place one bearing on either side of the highest point of the curved wall 190 with which the bearings cooperate. Thus, the frame 182 is able to tilt from side to side, to a limited extent, relative to the housing 300.

Figure 3:
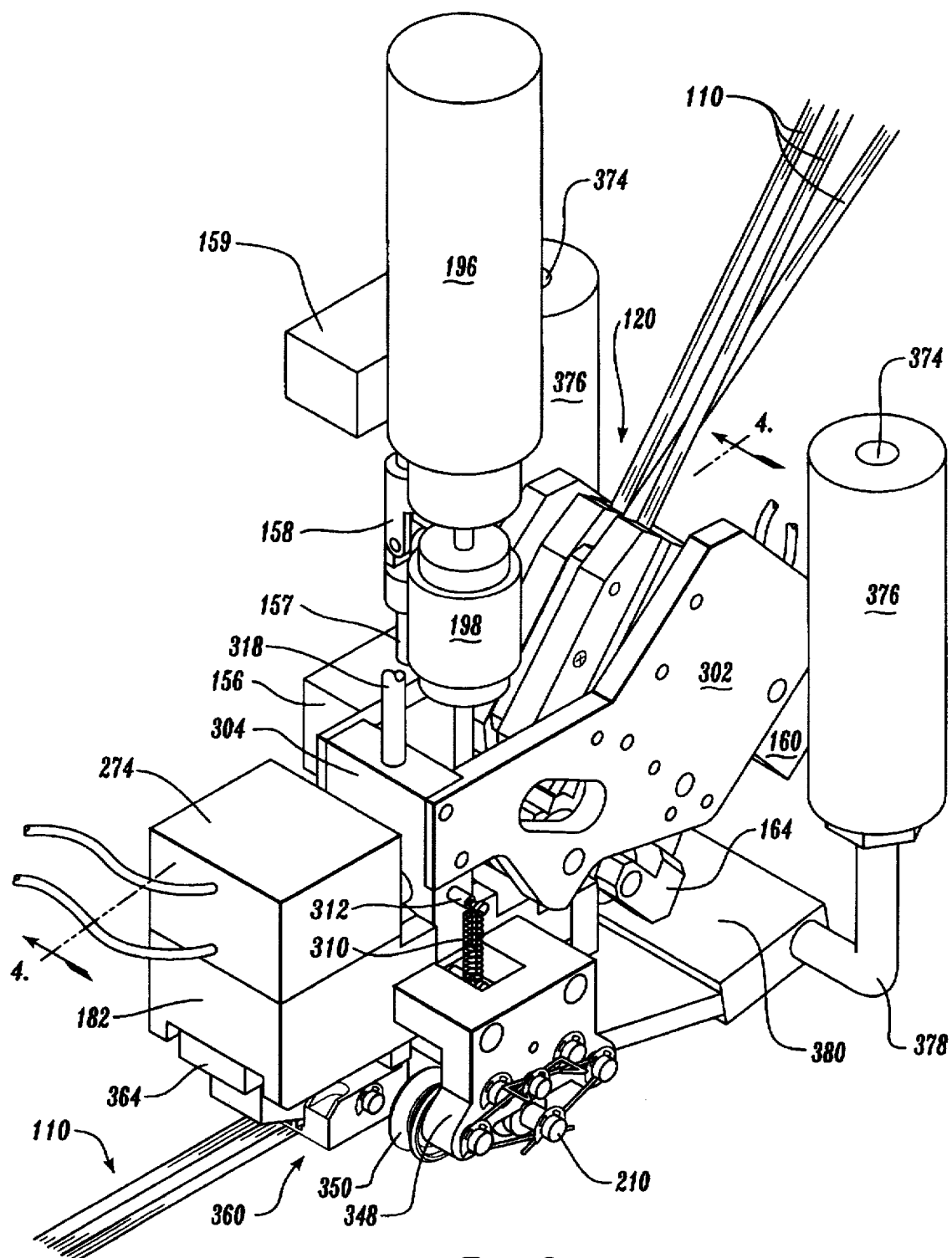
FIG. 3 is a perspective view of an embodiment of the invention, showing all parts assembled.
Figure 4:
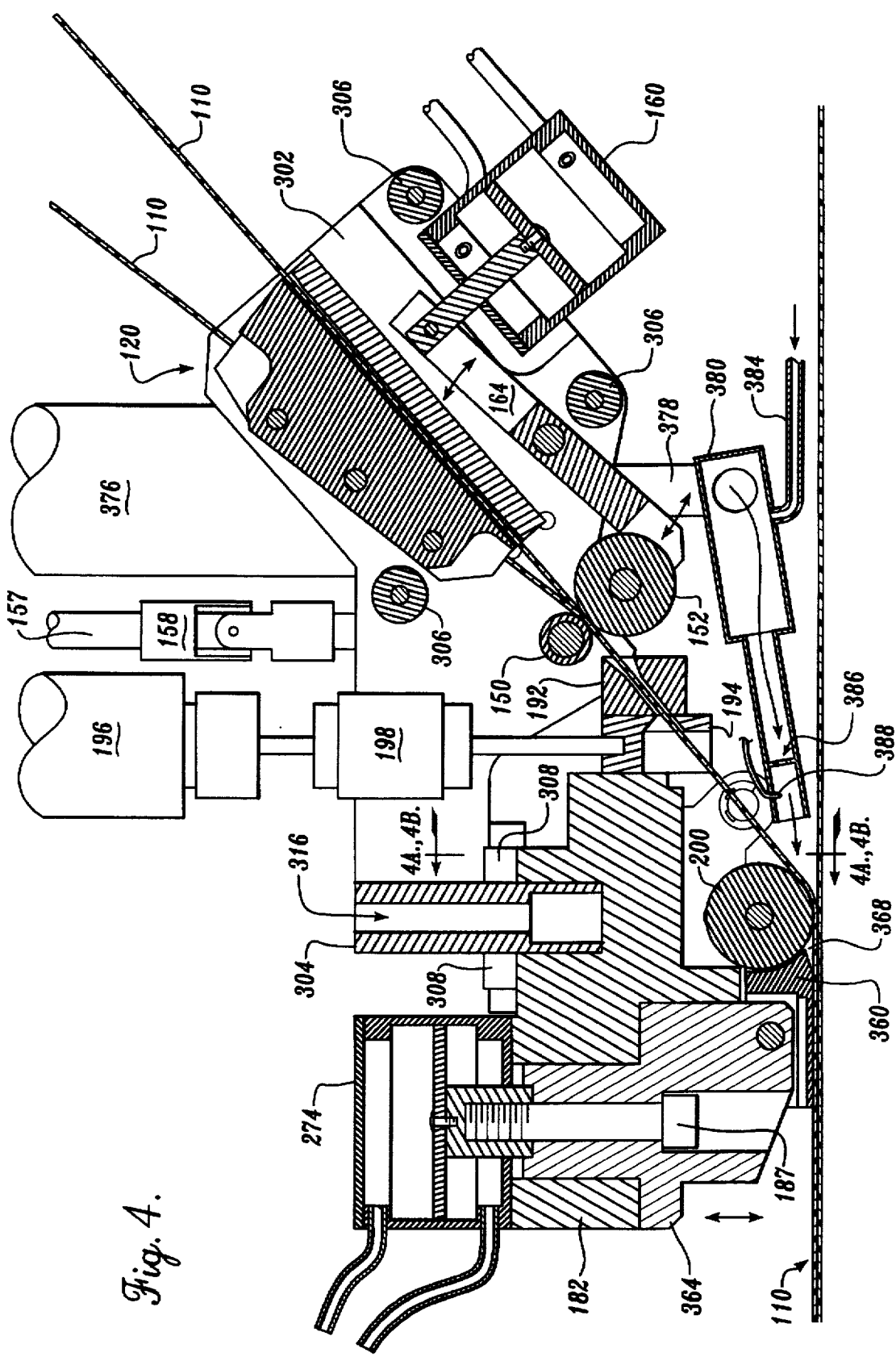
FIG. 4 is a schematic side view, in partial cross section, of an embodiment of the thermoplastic head of the invention oriented to lay down tape on a workpiece.
Figure 4A:
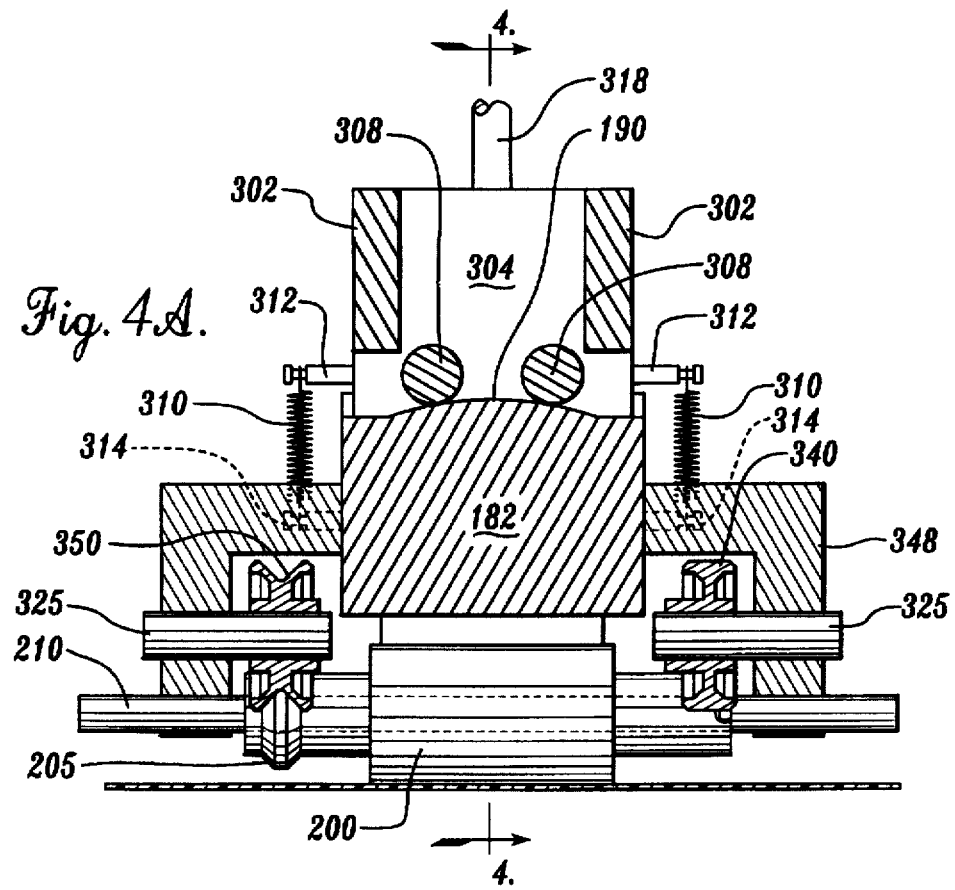
FIG. 4A is an end view, in partial cross-section, taken along 4A of FIG. 4.
Figure 4B:
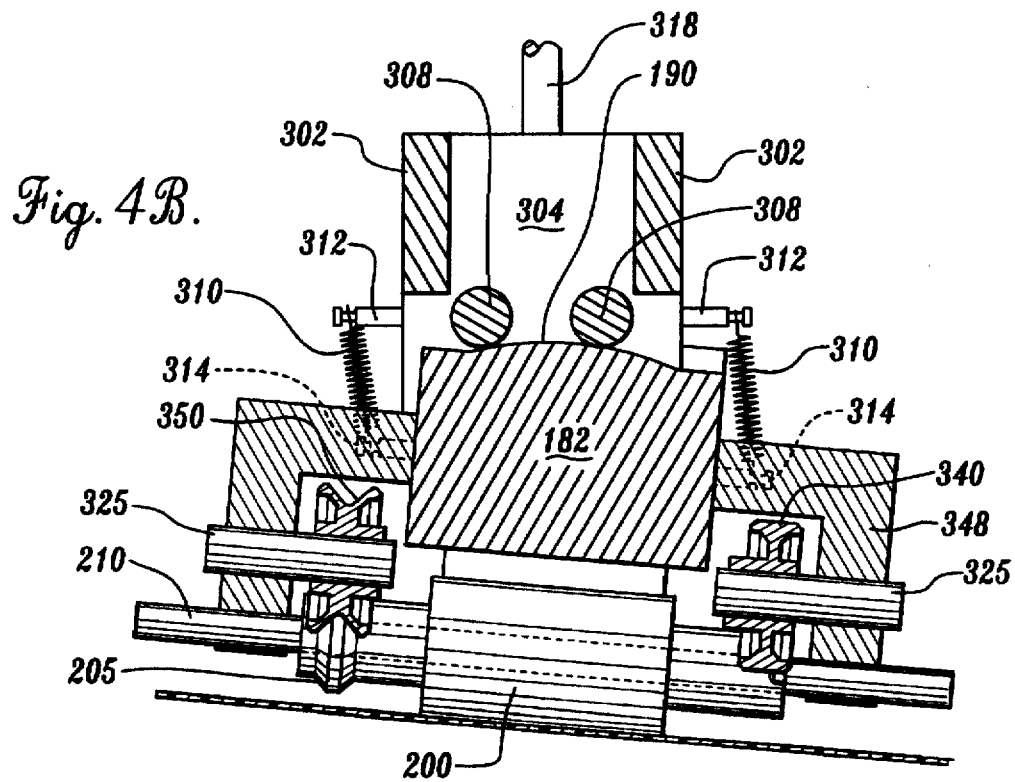
FIG. 4B is a side view, in partial cross-section, taken along 4B of FIG. 4.

FIGS. 4A and 4B also illustrate this cam-controlled tilting of the frame relative to the housing. Moreover, as shown in both FIGS. 4A and 4B, the frame 182 is resiliently and cammingly attached to the housing by a pair of opposing springs 310. Each spring has an upper end fixedly attached to a pin 312 extending transversely outward from the support mast 304 of the housing, and a lower end attached to a similar pin 314 fixedly attached to, and extending transversely out from, the frame 182. Thus, the combination of the cam surfaces and the opposing springs allows controlled tilting of the frame 182 (and hence the roller 200 mounted to the frame) relative to the housing 300. To exert downward pressure on the thermoplastic head, the mast 304 has a vertical bore 316 for receiving a shaft 318 (see FIG. 3). Pressure is applied vertically downward on this shaft to press the roller assembly, mounted below frame 182, onto the workpiece or force is applied upward to lift the head from the workpiece.

Near a front end of the frame 182 are two spaced-apart parallel forward-extending flanges 184. A guillotine 170, including two members, is mounted to these flanges. A rectangular stationary guillotine member 192, having a slot extending transversely therethrough, is mounted to the ends of flanges 184 so that the slot is able to receive tape from the guide slots. A reciprocating mating guillotine member 194 is interposed in the space between the flanges 184 so that a transverse slot extending through its vertical opposed faces aligns with the slot in the stationary guillotine member 192 to form a common slot. A rear vertical face of member 194 cooperates slidingly with a forward vertical face of member 192 to cause shearing of tape in the common slot as it is closed by reciprocation of member 194. The reciprocable member 194 is preferably reciprocated by a controlled pneumatic pressure cylinder 196 located above the guillotine. A reciprocating rod 199 extends from the cylinder to a self-aligning joint 198 which is in mm connected to the upper end of the guillotine member 194. Thus, the cylinder motivates the guillotine member.

The embodiment of the compression roller shown in FIG. 2 has nitrogen gas-cooled cooperating rollers, shown more clearly in FIGS. 6, 6A, and 6B, and explained in more detail below. The roller rotates clockwise (with reference to FIGS. 1 and 3) to pull tape beneath the roller from between the rethread rollers. In FIG. 2, the roller 200 has intermediate integral smaller diameter concentric cylindrical shoulders 202, 204 on either side of the roller. The roller is mounted on an axial shaft 210 so that it does not rotate relative to the shaft. The roller is rotatably held in place beneath the frame 182 with each shoulder 202, 204 of the roller engaged in a nip between a pair of cooled rollers 340 and 350, both pairs rotatably mounted above the roller. One shoulder 202 of the shaft 210 extending from the compression roller is of constant diameter, while the other end 204 has a circumferential ring 205 near the end of the shaft. As seen more clearly in FIG. 6, this ring cooperates with a V-shaped groove 352 extending around the circumference of each of the pair of cooled rollers 350. Thus, the ring engages the grooves of the rotatable cooled rollers 350, which are in turn rotatably mounted to roller cover plate 348, by axial shafts 325 with grooved ends and split rings 326, so that their respective centers of rotation are above the center of rotation of the compression roller. As a result, the compression roller is prevented from moving transversely. Cold gas or air is supplied in a gas line 320 to a pair of gas nozzles 322 in the cover plate. The gas nozzles 332 are integral to the cover 348 and extend through the cover to direct the cold gas or air directly onto the rollers 350, as shown in FIG. 6.

FIG. 6A shows a typical grooved roller 350, with axial bore 354, webs of reduced thickness 356, and a series of equally spaced throughbores 358 in the web.

The other pair of likewise cooled rollers 340, shown in FIG. 6B, need not have circumferential grooves, and are preferably not grooved. As seen in FIG. 6, like rollers 350, rollers 340 are rotatably mounted to a cover plate 348 with their centers of rotation above the center of rotation of the roller, and are also air or gas cooled. The surface of the smooth end 202 of the compression roller shaft 210 is controlledly held in the nip between the circumferential surfaces of the pair of cooled rollers 340 so that the cooled rollers rotate in concert with the compression roller. Cold nitrogen (or another cold gas) is supplied in a line 320 to nozzles 332 drilled through the cover plate 348 to direct the gas directly onto the rotating rollers 340. As shown in FIG. 6B, these rollers also have an axial bore 342, a web 346 of reduced thickness extending from the bore to the outer circumferential cylindrical surface portion 348, and a plurality of equally spaced throughbores in the web.

As a result of the cold gas impinging on the rollers 340, 350, the cylindrical roller is cooled. Heat transfers, by conduction, from the shoulders 202, 204 of the roller 200 to the cold rollers 340, 350 and is removed by convective cooling.

As explained above, in the embodiment shown, each of the cooled rollers is rotatably mounted on axial shafts 325 and is held in place on the shafts with split-ring clips 326 that engage grooves on each end of each of the shafts, the grooves being spaced to receive the cooled rollers between them. One end of each of the transverse shafts is mechanically attached into a bore in the cover plate 348 that protectively shields the rollers 340 and 350, while allowing the rollers to rotate freely. The cover plates are in turn each mechanically fastened to the central frame 182. The rotatable mounting of the rollers is more clearly appreciated from FIG. 3, viewed in conjunction with FIG. 2. For each pair of rollers, three transverse pins 354 are arranged in a triangular array in bores in the cover plates 348. The pins are held in place by split rings 356 engaging grooves on either end of the pins. A pair of resilient clip members 358 cooperate with ends of the pins 354 extending outward from the cover plates 348, and outward extending ends of shafts 325 (of the cold rollers) and shaft 210 to support the roller 200 beneath and between the cold rollers 350 and 340 so that the roller does not fall downward, under gravity, when the thermoplastic head is lifted from the workpiece.

In a preferred embodiment, shown in FIG. 6, one of the cold rollers 350 is driven, and thereby drives the compression roller 200. As shown, the axial shaft 325 of one of the cold rollers 350 extends transversely outward from the cover plate 348, and a pinion wheel 390 is fixedly mounted to the shaft to rotate in concert with driven roller 350. The circumference of this pinion wheel is in turn in frictional rotational contact with the circumference of drive wheel 392, that is mounted on a transverse horizontal axial drive shaft driven by an electrical motor 394 through a clutch. The drive wheel is urged against the pinion wheel by a spring-and-pivot mechanism, as explained below with reference to FIG. 5A. As a result, the motor drives the drive wheel, through a clutch, and the drive wheel drives the pinion wheel and hence the roller 350 that in turn drives the compression roller 200.

Figures 5, 5A:
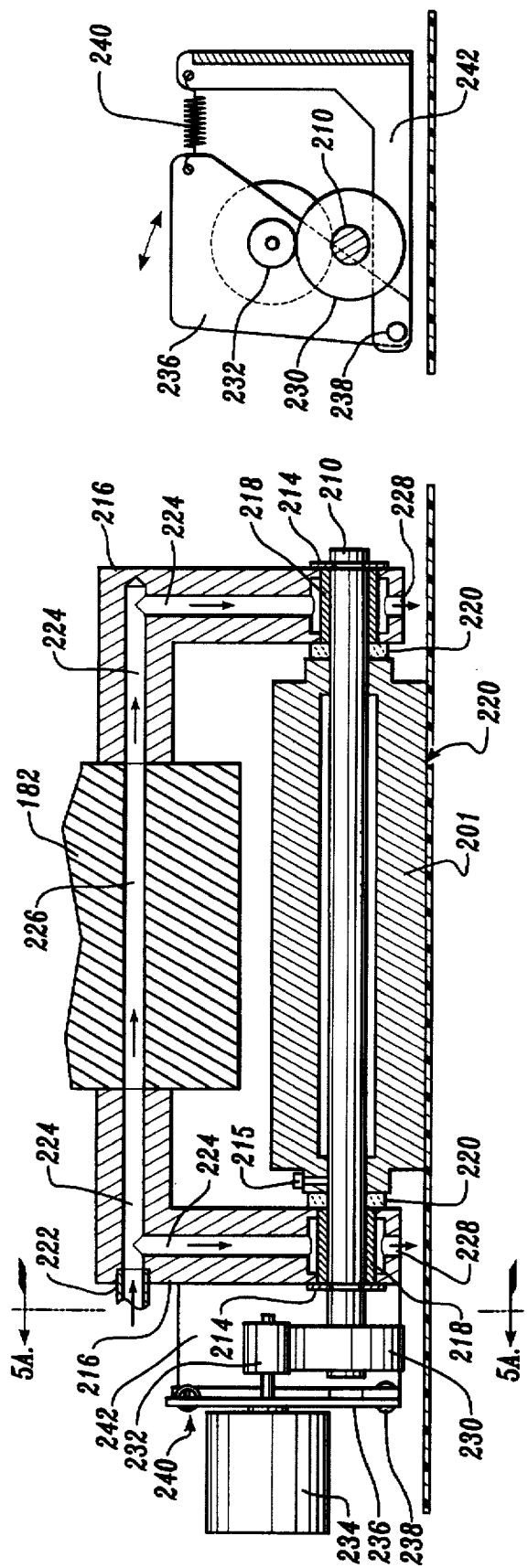
FIG. 5 is a simplified cross-section through a portion of an embodiment of a compression roller showing the internal air-cooled bearings.
FIG. 5A is an end view taken along 5A—5A of FIG. 5 to show the roller drive assembly.

In an alternative embodiment, FIG. 5, the roller 200 has a central axial throughbore in which is disposed a shaft 210 to which it is fixedly attached by a pin 215 that extends radially through the roller to a cooperating radial bore in the shaft 210. The shaft is spaced from the inner surface of the central throughbore in the roller along most of its length to provide an annular air gap. This annular air gap minimizes heat transfer from the roller to the shaft. The ends of the shaft are supplied with air-cooled bearings. In this embodiment, the roller is mounted beneath the frame 182, so that each end of the shaft of the roller is rotatably held in a roller mount 216 on the sides of the frame 182. Each mount extends from a point of mechanical attachment to the frame 182, transversely outward, then downward to the vicinity of the ends of the shaft 210 of the compression roller 200. Each mount has a throughbore for receiving the ends of the shall 210 that are each surrounded by an air-cooled bearing 218. As a result, the shaft is able to rotate freely within the beatings and thereby cause rotation of the roller 200. The roller 200 is fixed in transverse location by split rings 214 that engage grooves on either end of the shaft 210 and that abut against an outside surface of the roller mount 216. In order to cool the bearings, and remove heat transmitted from the roller and the heating assembly, the mount 216 has an internal air channel 224 that extends from an air inlet nozzle 222 in the mount, horizontally through a horizontal cooperating channel 226 in frame 182, to a horizontal internal air channel 224 in the opposite side roller mount 216. Each of the channels 224 have a leg that extends vertically downward, from near outer extremities of the horizontal channels, to the throughbores in the mounts 216 that surround the air-cooled beatings 218. To allow free flow of cold gas or air through the channels 224 and 226, and around the air-cooled bearings, outlets 228 are provided from the bores surrounding the air cooled bearings. As a result, cold air enters through nozzle 222, travels along channel 224 (and 226), flows around air-cooled bearings 218, and exits through outlets 228, carrying with it heat removed from the bearings.

To reduce the amount of heat transferred from the roller to the bearings, a ceramic washer 220 is interposed between terminal ends of the roller 200 and the inner surfaces of mount 216. These ceramic washers have low thermal conductivity and thus further shield the shaft from heat from the roller 200.

Importantly, in this embodiment, the roller is preferably driven by a motor through a clutch with torque adjusted to cooperate with the clutches of the tape spools 206 and the driven rethread roller 150 to maintain tape tension. As explained above, the compression roller driver clutch and the rethread roller driver clutch are both set to slip or disengage before the clutches of the tape spools. Ultimately, when the head operates at a high rate of tape lay down, tape tension is controlled by the tape spool clutches.

Referring to FIG. 5, a pinion wheel 230 is axially mounted to an end of shaft 210 that extends beyond the mount 216. A drive wheel 232, driven through a clutch by motor 234, is mounted such that its outer circumference is in frictional rotational contact with outer circumference of the pinion wheel to drive the pinion wheel causing the shaft 210 and the roller 200 to rotate. As seen in FIG. 5A, the drive wheel is urged against the pinion wheel by a pivot-and-spring arrangement. The motor is mounted to a longitudinally-extending vertical support plate 236 that is pivotally attached at a lower forward corner to a lower end of an L-shaped bracket 242. The bracket is fixedly attached to, and extends longitudinally alongside, mount 216. A diametrically opposite corner of the support plate is attached to one end of a tensioned, substantially horizontal spring 240. The other end of the spring is attached to an upper end of bracket 242. Thus, the spring urges the support plate to pivot toward the L-shaped bracket. In so doing, the spring urges the drive wheel 232, attached to the motor 234, against the pinion wheel 230.

A post-compactor 360 is also mounted to the frame 182, behind the compression roller, so that the flat underside of the post-compactor passes over and cools tape that has been laid down. The post-compactor 360 has a flat base with a smooth surface for sliding over and compressing tape to the workpiece. In an important aspect of the post-compactor, the base features a chamfer 368 at its front end, as shown in FIG. 4. This assists by allowing for some cooling of the tape before the tape is guided by the chamfer's angled surface downward to beneath the base of the post-compactor. The post-compactor also features fins 362 for active-cooling. A series of longitudinal cooling fins 362 extend above the upper face of the compactor, and are partially surrounded by a U-shaped wall 361 on the front and sides of the post-compactor. The fins are actively cooled by a jet of cold air to remove heat that was removed from the tape through the base of the compactor.

To mount the post-compactor to the frame 182, it is first mounted to a post-compactor mount 364. A lower portion 368 of the post-compactor mount is shaped to cooperate with and fit within the U-shaped wall 361 on the post-compactor upper surface. Hinged connection (with limited rotational ability) is achieved by a rod 366 extending transversely through bores in the side limbs of the U, and the lower cooperating compactor mount portion 368. Thus, the compactor mount and compactor are hinged together around this rod, that is conveniently held in place by split rings 365 engaging circumferential grooves at its ends. An upper cylindrical portion 372 of the mount 364 is inserted into a cylindrical bore 186 in flame 182. A vertical bolt 187 extends through a vertical central bore of the mount 364 and threadingly engages a lower end of a cylindrical leg 275, of a pressure cylinder 274, that is inserted into the upper portion of bore 186.

In order to exert pressure on the post-compactor 360, the controlled pneumatic pressure cylinder 374 is mounted directly above, and in mechanical communication with, the cylindrical portion 372 of the post-compactor mount. Thus, pressure from the pneumatic cylinder is transmitted through its leg to the post-compactor mount and thence to the post-compactor and the underlying tapes that are consolidated onto the workpiece.

The heating assembly of the invention is adapted to supply hot inert gas at a sufficiently high temperature to cause reduction in the viscosity of the resin of the tape to facilitate consolidation. As shown in FIG. 2 and FIG. 4, the heating system includes two substantially vertically oriented cylindrical electrical heating elements 376. Each of these heating elements contains a spiral winding of a resistive heating material, such as carbon. An inert gas, preferably nitrogen, enters into central throughbores 374 of the cylindrical heaters, flows over and is heated by the heating elements, and exits from the heaters through outlet conduits 378. The outlet conduits carry the gas into a mixing plenum 380 where gas from the two heaters combines, mixes, and then flows, out of exit nozzle 382. Exit nozzle 382 is oriented to direct the hot gas directly onto tape that is being consolidated. Importantly, the plenum 380 is supplied with a baffle 386 extending substantially across the entire length of the exit nozzle 382 to provide back pressure within the plenum and thereby facilitate mixing of gasses. A thermocouple 388 is preferably located downstream of the baffle to monitor the temperature of hot gasses exiting from the plenum for impingement onto the tape. This thermocouple may also be used to control the current supplies to the electrical heating elements in the heaters 376 and/or to control the mass flow of inert gas through the heaters in order to maintain a desired exit gas temperature.

The heating system is controlled so that when a strip of tape has been laid down, and the thermoplastic head is lifted from the workpiece, cold gas is immediately charged into the plenum through inlet 384, thereby rapidly mixing with hot gas from the heaters to provide a colder mixture through exit nozzle 382 that impinges on the compression roller 200. This prevents overheating of the roller and its components and avoids thermally-induced fatigue and wear. When the head is in position for commencing the laying down of another strip of tape, the gas flow through inlet 384 is immediately cut off. As a consequence, the inlet gas is the only gas that flows through the heating system and this gas is virtually immediately available at the desired temperature from the heaters.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A thermoplastic head for simultaneously laying down thermoplastic resin-impregnated tape from at least two spools of tape to form a composite, the head comprising:
   (a) a mandrel requiring a force for rotation, the force controlled by a clutch, the force sufficient to controlledly tension tape unwound from at least two spools of tape rotatably mounted on the mandrel;
   (b) a tape guide assembly, the assembly comprising at least two side-by-side guide channels, the channels sized to match the width of tape supplied from the at least two spools of tape on the mandrel, the assembly comprising spacing adjusters for adjusting spacings between the guide channels;
   (c) a compression roller assembly comprising a rotatable compression roller mounted with a longitudinal axis thereof transverse to a direction of lay down of tape from the guide assembly, the rotatable compression roller comprising an axial shaft having first and second ends extending outwardly from each end of the roller, the first end of the shaft being smooth, and the second end comprising a circumferential ring the roller urged toward a workpiece whereon tape is laid down so that tape passing beneath the roller is urged towards the workpiece;
   (d) a pneumatic cylinder in communication with the compression roller for controlledly urging the roller toward the workpiece;
   (e) a heater assembly comprising an electrical resistance heater for heating an inert gas, and a plenum in fluid communication therewith, the plenum having a transverse nozzle therein approximating the length of the compression roller, the heater assembly mounted near the compression roller so that hot air exiting from the nozzle of the heater impinges on and heats tapes being laid down by the compression roller; and
   (f) a post-compression foot behind the compression roller to apply pressure to laid down tape.

2. The thermoplastic head of claim 1, wherein the circumferential ring of the shaft is engaged within V-shaped grooves of two cooler rollers, the two cooler rollers mounted with their respective centers of rotation above a center of rotation of the compression roller.

3. The thermoplastic head of claim 2, wherein the cooler rollers comprise thin webs with throughbores to facilitate cooling of the cooler rollers with jets of gas.

4. The thermoplastic head of claim 1, further comprising a guillotine shearing cutter interposed between the tape guide assembly and the compression roller assembly, the guillotine comprising a first stationary guillotine member having a transverse slot therethrough for allowing passage of the at least two tapes, and a second reciprocating guillotine member having a second transverse slot therein, the first and second slots aligned to allow passage therethrough of tapes from the at least two spools, whereby reciprocation of the second guillotine member shears tape passing through the slots.

5. The thermoplastic head of claim 1, wherein the clutch controlling the mandrel comprises opposing clutch surfaces that have substantially the same static and dynamic coefficients of friction.

6. The thermoplastic head of claim 5, wherein the opposing surfaces of the clutch comprise an acetal polymer.

7. The thermoplastic head of claim 1, wherein the plenum of the heater assembly comprises a baffle near the exit nozzle, the baffle providing back pressure to cause mixing of gasses within the plenum.

8. The thermoplastic head of claim 1, wherein the heater assembly comprises a thermocouple, the thermocouple extending into the plenum to measure the temperature of gases therein.

9. The thermoplastic head of claim 8, wherein the plenum of the heater assembly comprises an inlet for supplying cold air to the plenum.

10. A thermoplastic head assembly comprising:
   (a) tape guide assembly for guiding three tapes supplied to a thermoplastic head, the guide assembly comprising:
      (1) a central body portion, the body portion having a first and a second longitudinally extending sides, the body portion having a longitudinal channel extending therethrough for receiving and guiding a tape to a central body exit slot, the channel located centrally between the first and second sides;

(2) a first side body portion, aligned along the first side of the central body portion, the first body portion having a longitudinal channel extending therethrough for receiving and guiding a tape to a first exit slot, the side body portion adjustably attached to the first side of the central body portion to allow adjustment of the distance between the central body exit slot and the first exit slot; and (3) a second side body portion aligned along the second side of the central body portion, the second body portion having a longitudinal channel extending therethrough for receiving and guiding a tape to a second exit slot, the second side body portion adjustably attached to the second side of the central body portion to allow adjustment of the distance between the central body exit slot and the second exit slot;

(b) a compression roller assembly for receiving and compressing thereunder guided tape from the tape guide assembly, the roller assembly comprising a rotatable compression roller mounted with a longitudinal axis thereof transverse to a direction of lay down of tape from the guide assembly, the roller urged toward a workpiece whereon tape is laid down so that tape passing beneath the roller is urged towards the workpiece;

(c) a heater assembly comprising an electrical resistance heater for heating an inert gas, and a plenum in fluid communication therewith, the plenum having a transverse nozzle therein approximating the length of the compression roller, the heater assembly mounted near the compression roller so that hot air exiting from the slot of the heater impinges on and heats tapes being laid down by the compression roller; and (d) a post-compression foot behind the compression roller to apply pressure to laid down tape;

wherein distances between the central, first side and second side body portions of the tape guide assembly are adjustable by a positional drive screw.

11. The thermoplastic head of claim 10, wherein the plenum of the heater assembly comprises an inlet for cold air to allow controlled charge of air for reduction in exit gas temperature.

12. The thermoplastic head of claim 10, wherein the compression roller comprises air-cooled beatings on either end of an axial shaft of the compression roller.

13. The thermoplastic head of claim 10, wherein the rotatable compression roller comprises an axial shaft having first and second ends extending outwardly from each end of the roller, the first end of the shaft being smooth, and the second end comprising a circumferential ring.

14. The thermoplastic head of claim 13, wherein the circumferential ring of the shaft is engaged within V-shaped grooves of two cooler rollers, the two cooler rollers mounted with their respective centers of rotation above a center of rotation of the compression roller.

15. A thermoplastic head for simultaneously laying down thermoplastic resin-impregnated tape from at least two spools of tape to form a composite, the head comprising:

(a) a tape guide assembly for guiding tapes supplied to the thermoplastic head, the assembly comprising at least two side-by-side guide channels, the channels sized to match the width of the tapes, the assembly comprising spacing adjusters for adjusting spacings between the guide channels;

(b) a compression roller assembly for receiving and compressing thereunder guided tape from the tape guide assembly, the roller assembly comprising a rotatable compression roller mounted with a longitudinal axis thereof transverse to a direction of lay down of tape from the guide assembly, the roller urged toward a workpiece whereon tape is laid down so that tape passing beneath a roller is urged towards the workpiece, the roller assembly mounted to a frame comprising a camming surface;

(c) a heater assembly comprising a plenum having a transverse nozzle therein approximating a length of the compression roller, the heater assembly mounted near the compression roller so that hot air exiting from the nozzle of the heater impinges on and heats tape being laid down by the compression roller;

(d) a post-compression foot behind the compression roller to apply pressure to laid down tape; and (e) a housing comprising two spaced-apart needle bearings with transversely extending cylindrical surfaces, the needle bearings cooperating with the camming surface of the compression roller frame to allow tilting movement of the compression roller assembly relative to the housing.

16. The thermoplastic head of claim 15, wherein the housing is attached to the frame by a pair of opposed springs, the springs allowing controlled tilting of the compression roller relative to the housing when the camming surface cooperates with the needle bearings.

17. The thermoplastic head of claim 15 wherein the post-compression foot comprises cooling fins on an upper surface thereof, the cooling fins adapted to dissipate heat when gas is blown over the fins.

18. The thermoplastic head of claim 15, wherein the post-compression foot further comprises a frontal chamfered portion, the chamfer aligned to guide compressed tape to beneath a base of the foot for post compaction.

* * * * *

UNITED STATES PATENT AND TRADEMARK OFFICE
CERTIFICATE OF CORRECTION

PATENT NO. : 5,700,347
DATED     : December 23, 1997
INVENTOR(S) : P.D. McCowin

It is certified that error appears in the above-indentified patent and that said Letters Patent is hereby corrected as shown below:

COLUMN      LINE

13              45            "beatings" should read --bearings--
(Claim 12,    line 2)

14              44            After "of claim 15" insert --,--
(Claim 17,    line 1)

Signed and Sealed this

Seventh Day of April, 1998

Attest:

BRUCE LEHMAN

Attesting Officer            Commissioner of Patents and Trademarks